(12) United States Patent
Chouery

(10) Patent No.: US 8,151,073 B2
(45) Date of Patent: Apr. 3, 2012

(54) SECURITY SYSTEM FOR COMPUTERS

(75) Inventor: Farid A. Chouery, Seattle, WA (US)

(73) Assignee: FAC Systems Inc., Seattle, WA (US)

( * ) Notice: Subject to any disclaimer, the term of this patent is extended or adjusted under 35 U.S.C. 154(b) by 478 days.

(21) Appl. No.: 12/490,809

(22) Filed: Jun. 24, 2009

(65) Prior Publication Data

US 2009/0327637 A1 Dec. 31, 2009

Related U.S. Application Data

(60) Provisional application No. 61/075,624, filed on Jun. 25, 2008.

(51) Int. Cl.
*G06F 13/10* (2006.01)

(52) U.S. Cl. ........................................ 711/163

(58) Field of Classification Search .................... None
See application file for complete search history.

(56) References Cited

U.S. PATENT DOCUMENTS

| | | | |
|---|---|---|---|
| 4,975,950 A | 12/1990 | Lentz |
| 5,623,691 A | 4/1997 | Clohset |
| 5,748,957 A | 5/1998 | Klein |
| 6,272,533 B1 | 8/2001 | Browne |
| 2006/0004737 A1 | 1/2006 | Grzonka |
| 2006/0031937 A1 | 2/2006 | Steinberg |
| 2006/0031940 A1 | 2/2006 | Rozman |
| 2006/0136338 A1 | 6/2006 | Maor |
| 2006/0137013 A1 | 6/2006 | Lok |
| 2006/0225137 A1 | 10/2006 | Odins-Lucas |
| 2006/0272017 A1 | 11/2006 | Largman |
| 2006/0277433 A1 | 12/2006 | Largman |
| 2007/0136810 A1 | 6/2007 | Waltermann |
| 2008/0052507 A1 | 2/2008 | Chow |
| 2008/0134335 A1 | 6/2008 | Kameda |
| 2009/0019388 A1 | 1/2009 | Zhang |

OTHER PUBLICATIONS

"Secret Disk 6.5," 10001 Downloads.com, <http://secret-disk.10001downloads.com/> [retrieved Sep. 30, 2009], at least as early as Aug. 23, 2008, 4 pages.
"System File Checker," Wikipedia, The Free Encyclopedia, Wikimedia Foundation, Inc., <http://en.wikipedia.org/wiki/System_File_Checker> [retrieved Oct. 1, 2009], at least as early as Jun. 22, 2009, 3 pages.
"Windows File Protection," Wikipedia, The Free Encyclopedia, Wikimedia Foundation, Inc., <http://en.wikipedia.org/wiki/Windows_File_Protection> [retrieved Sep. 23, 2009], at least as early as Jul. 1, 2009, 2 pages.

*Primary Examiner* — Duc Doan
(74) *Attorney, Agent, or Firm* — Christensen O'Connor Johnson Kindness PLLC

(57) ABSTRACT

A security system designed to trap computer viruses is described. The system storage has an external alarm configured to monitor the time every file takes to load by monitoring the drive activity LED of the storage device. The document storage location is hidden and can optionally be accessed via password. If a virus spends an unexpected amount of time attempting to access storage the alarm will trigger. Downloads and other untrusted files are stored in quarantine storage. Documents can only be transferred from the quarantine storage to the system storage via a copy and paste program.

20 Claims, 5 Drawing Sheets

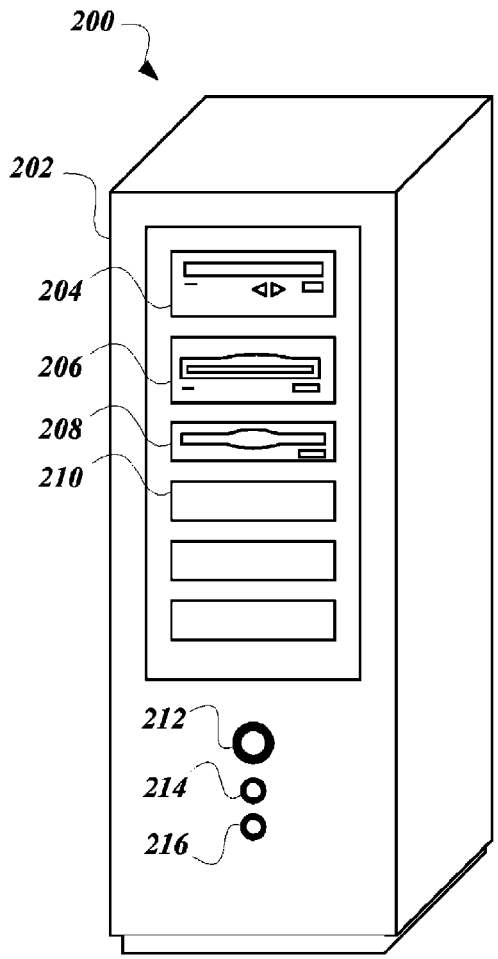
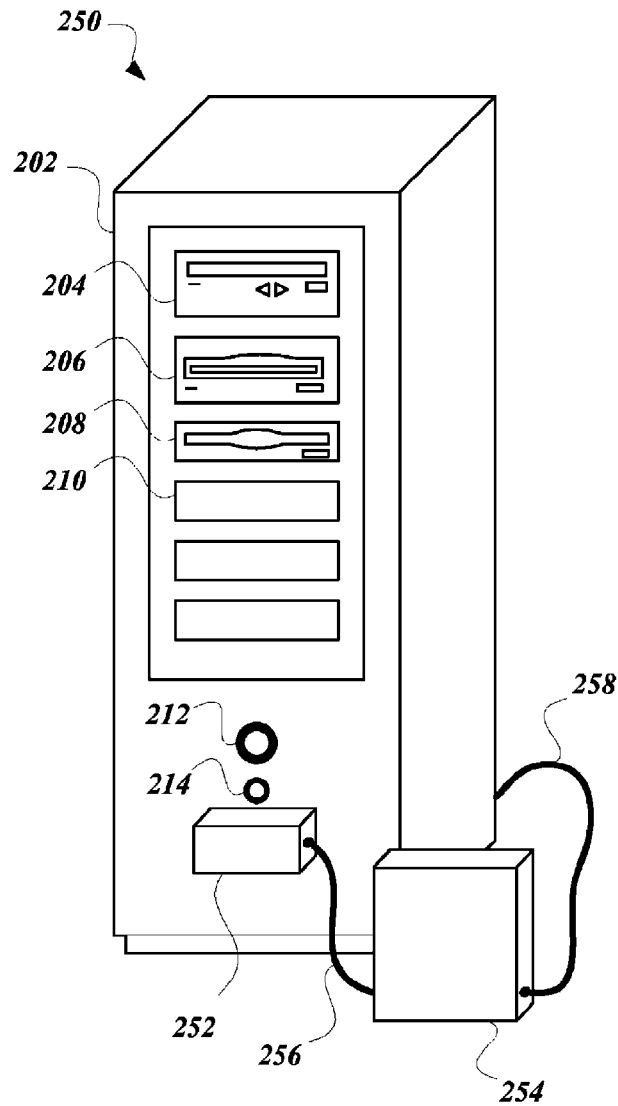
*Fig.2A.*  *Fig.2B.*

SECURITY SYSTEM FOR COMPUTERS

CROSS-REFERENCE TO RELATED APPLICATION

This application claims the benefit of U.S. Provisional Patent Application No. 61/075,624, filed Jun. 25, 2008, which is incorporated herein by reference.

BACKGROUND

In the past, malware such as email viruses, Trojan horses, worms, adware, and spyware were detectible by some form of antivirus software. When executed, worms and Trojan horses, like viruses, may cause harm to a computer system's stored data, functional performance, or networking throughput. Some viruses and other malware have symptoms noticeable to the computer user, but many are surreptitious. A type of virus that is causing much anxiety in the scientific community due to its ability to evade detection is a type of virus that gets into a specific result data file, corrupting or changing only one value or string at a time. This type of virus then stops and even erases itself, or targets disabling program files located in a document storage unit. Other similar viruses get into banking documents and try to steal money. These viruses can cause much danger and harm to society, for example, by altering medical records, causing financial devastation, or altering output files from engineering programs.

The architecture of the computer was not originally designed for defending against virus intrusions from the Internet. Therefore, what is needed is an improved mechanism and technique to detect the presence of virus intrusions in order to give the user a higher degree of confidence in the security of their valuable documents.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for providing a secure computing environment within a computer is provided. The system comprises a system storage device for use by a computer and configured to store system files; a drive activity monitor coupled to an activity indicator configured to indicate when the system storage device is accessed; and an alarm circuit coupled to the drive activity monitor and the system storage device, and configured to disconnect the system storage device from the computer based on information collected by the drive activity monitor.

In other embodiments, a method for protecting a computer system from malware is provided. The method comprises receiving a notification identifying a file to be loaded from a protected storage location; retrieving an expected load time for the file; detecting an activation of a disk drive with a disk activity detection circuit that detects an attempt to access the protected storage location; comparing an actual load time for the file to the expected load time; and performing a protective action when the actual load time does not match the expected load time.

In other embodiments, a system for providing secure storage of computer files is provided. The system comprises storage means for storing a set of monitored files; an activity indicator light for indicating an attempt to access the storage means; and means for monitoring the activity indicator light, configured to indicate the presence of malware upon detection of an indication by the activity indicator light that does not match an indication of an allowable attempt to access the storage means.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A and 2B illustrate an exemplary installation of an external alarm according to various embodiments of the present disclosure;

DETAILED DESCRIPTION

One way to defend against the type of viruses described above is to isolate a document storage unit from a system storage unit in a computer system and have it accessible to the user only through a special copy and paste program for download files. The document storage unit and the system storage unit are monitored for unauthorized access. In general, system program files have a set time for loading from a system storage unit and have a set size. When the system storage unit is isolated from the document storage unit, and an operating system is provided with the location of the document storage unit via a password or hidden file, then the time for loading every file from the system storage unit or document storage unit can be monitored by a security device. If a malicious program or virus tries to find the location of the hidden document storage unit, extra time is spent in loading the file beyond the maximum time allowed to load system programs. The security device can detect this extra time and trigger an alarm. Also, if the malicious program alters files in the system file storage, the system files change size, which can also be detected by the security device.

When the alarm is triggered by the security device, the security system receives a signal and, in response, stops the malicious program in memory and erases it from RAM. The security system may also disconnect the document storage unit until a safe signal instructs the security system to reconnect.

Figure 1:
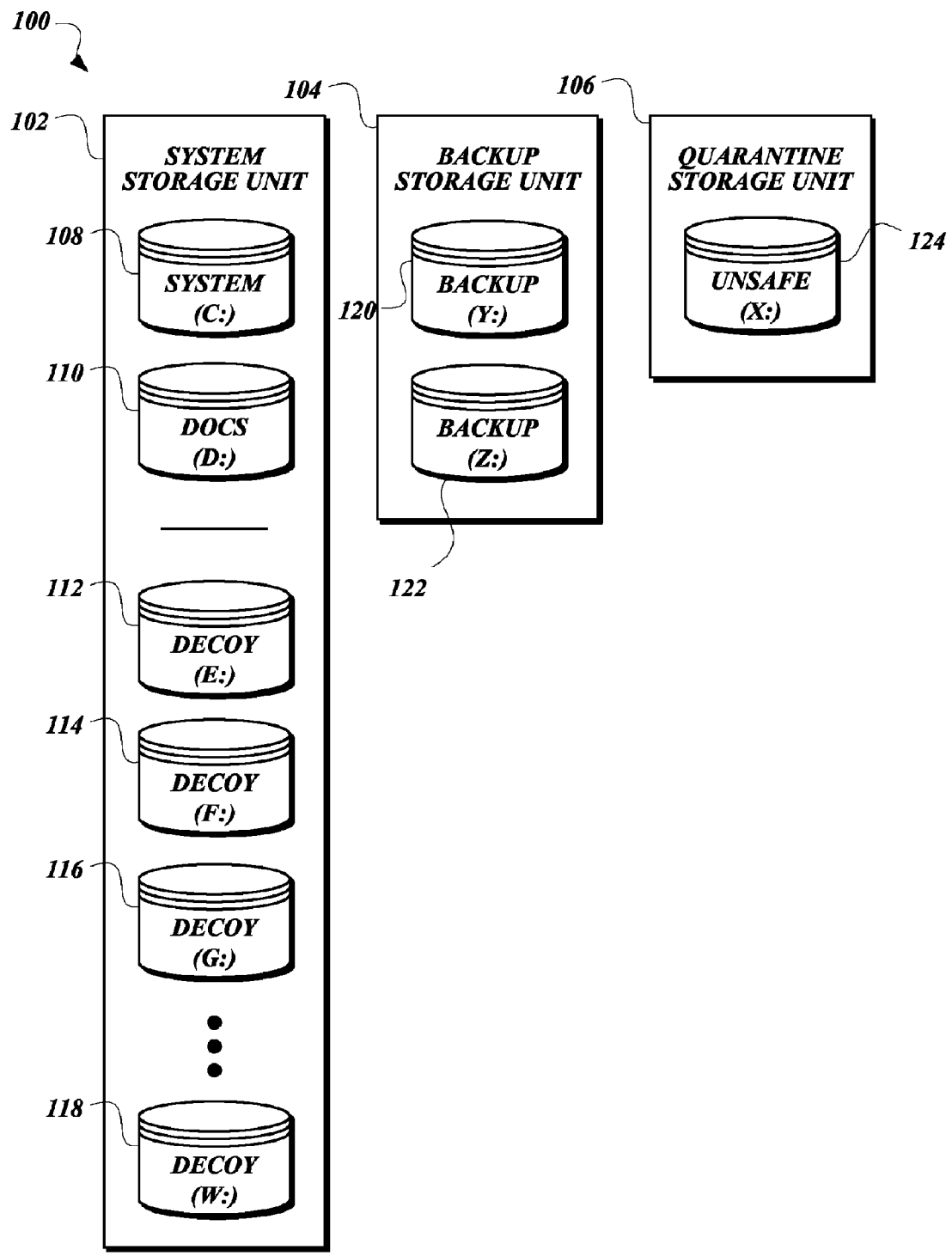
FIG. 1 is a block diagram showing an exemplary division of computer storage according to various embodiments of the present disclosure.

Embodiments of the new computer architecture described herein basically subdivide the computer storage into three parts: system storage, document storage, and quarantine permanent storage. FIG. 1 is a block diagram illustrating an exemplary division of computer storage 100 according to various embodiments of the present disclosure. The computer storage 100 is incorporated into a conventional server, desktop, laptop, or other portable computer of the type having a processor, RAM, I/O circuitry, etc. (not shown), as is well known. A system storage unit 102 is subdivided into at least a system drive 108 and multiple decoy drives 112, 114, 116, 118. The system software is installed on the system drive 108, but the owners of the operating system do not allow any documents, permanent email files, etc., to be saved in the system drive 108. Only system programs and the program files approved by the manufacturer are allowed on the system drive 108. The computer storage 100 similarly does not allow storage of system document files such as temporary directories on the system drive 108.

The computer storage 100 also contains a division for a document drive 110. As depicted in FIG. 1, the document drive 110 may reside on the same system storage unit 102 as the system drive 108. In other embodiments, the document drive 110 may reside on a separate storage unit. As system document files are not allowed to be stored on the system drive 108, such files must be stored on the document drive 110.

The computer storage 100 contains an additional division for a quarantine storage unit 106, which contains a quarantine permanent drive 124. Temporary files for email and downloads are stored in the quarantine permanent drive 124. Copying these files to the document drive 110 may only be done with proper software utilities. The system 100 will not allow users to copy any files from the quarantine permanent drive 124 by normal means, but only through software that copies the contents of the files using a copy-and-paste technique to another file in the document drive 110. In some embodiments, system storage divisions and subdivisions are different for every user and can be set by an administrator or other IT-certified individual.

As stated above, the remainder of the system storage unit 102 is divided into a plurality of decoy drives, such as decoy drive E: 112, decoy drive F: 114, decoy drive G: 116, and so on, to decoy drive W: 118. One or more of these decoy drives contain meaningless data files, to fool any virus or intrusion searching for valuable data into performing a labor-intensive search on this worthless data instead.

Embodiments of computer storage 100 may also include a backup storage unit 104 with one or more backup drives 120, 122. Backup drive Y: 120 is configured as a mirrored backup of the document drive 110, and will therefore contain a backup of all of the documents and virus free email files stored on the document drive 110. Backup drive Z: 122 is a ghost of the operating system, program files, and other system files of the system drive 108. In some embodiments, backup drive Y: 120 and backup drive Z: 122 are separate physical drives. In further embodiments, backup drive Y: 120 and backup drive Z: 122 are external USB drives connected to the system 100, and may be disconnected and remain in a safe place for future use.

While common drive names such as C:, D:, Z:, etc. have been illustrated and discussed, embodiments of the computer storage 100 are not limited to using these names. For example, the system drive 108 may use a different drive name, such as M:. Alternatively, the drive names could be randomized or encrypted such that the names of all of the drives are constantly changing, to help obfuscate the location of protected files and thereby prevent access by malware. For example, drives could be referred to via random number identifications instead of common single alphabetic characters, such as 24109: instead of C:.

In another embodiment, a program can use a password to work with a decryption program or access the document storage unit, wherein the password is the drive number used to access the file. In yet another embodiment, the user can use an electronic keypad or other auxiliary input device such that the key is not input through the keyboard, thereby avoiding some types of keystroke loggers from learning the key. Alternatively, this electronic key can also be a finger print type of security password, wherein the password is the drive number. In each of these embodiments that use something other than a traditional drive letter for drive access, the goal is to cause a virus searching the main system storage unit to come out empty, without knowing where the document drive 110 is or how to address it.

FIGS. 2A and 2B illustrate an exemplary installation of an external alarm according to various embodiments of the present disclosure. FIG. 2A illustrates a computer system 200 before installation of the external alarm. The computer system 200 comprises an external case 202, and a number of drives for removable media, such as a DVD drive 204, a CD-ROM drive 206, and a floppy disk drive 208. The computer system 200 may also include additional slots for future expansion 210. Alternatively, an embodiment of the computer system 200 may not contain any removable media drives, to further enhance security by providing as few data input options as possible. Computer system 200 also includes a power button 212, a power indicator light 214, and, importantly, a drive activity light 216. The drive activity light 216 is a common device such as an LED that indicates either an attempt to access data on a single hard drive, or an attempt to access data from any one of a number of storage devices connected to a common bus. In embodiments using the computer storage 100, any attempt to access any data store illustrated as residing on the system storage unit 102 will cause the drive activity light 216 to illuminate during the data access.

FIG. 2B illustrates a computer system 250 after installation of an exemplary external alarm. A drive activity monitor 252 is mounted over the drive activity light 216 (visible in FIG. 2A), and is communicatively coupled by cable 256 to an alarm circuit 254 to inform the alarm circuit 254 when drive activity is taking place. In other embodiments, the drive activity monitor 252 determines drive activity by directly monitoring a communication bus or by reading some other signal generated directly by a hard drive, processor, or drive controller that indicates drive activity. As illustrated, the alarm circuit 254 is separate from the external case 202 of the computer system 200, but in other embodiments, the alarm circuit 254 may be incorporated within the external case 202. The alarm circuit 254 includes an external power supply with backup batteries to ensure continued operation of the alarm. The alarm circuit 254 is further coupled to the computer system 250 and the computer storage 100 by cable 258. This coupling allows the alarm circuit 254 to receive information about attempts to access the computer storage 100, to instruct the computer system 250 to halt execution of detected malware, and to disconnect portions of the computer storage 100 upon the detection of malware. In some embodiments, the alarm circuit 254 has a manual switch that, when activated, causes the alarm to start or reset. Hence, these embodiments of the alarm circuit 254 cannot be programmatically disabled, and thereby require the attention of an administrator after malware is detected.

Since the system storage unit 102 includes a plurality of decoy drives, a malware program searching the decoy drives for files to infect will cause a great deal of drive activity. The drive activity monitor 252 will detect abnormal activity in the system storage unit 102 through the drive activity light 216 (or related signal) since the maximum allowable time spent in the system storage unit 102 elapsed. Additionally, if the malware mutates and the size of the files exceeds an initially recorded size of the files, the alarm will trigger and disconnect the storage drives. Also, any antivirus software or other trusted utility can send a signal to the external alarm circuit 254 to disconnect the storage drives. Along with preventing access to the system storage unit 102, the external alarm circuit 254 will immediately disconnect the backup storage unit 104 through a relay to prevent the malware from infecting the backup.

In other embodiments, the external alarm circuit 254 may simply display an indication to a user that the alarm has been activated. In these embodiments, the user can turn the computer off manually and disconnect the connection to the network. The user can then use backup drive Z: 122 to operate the computer and rebuild the system drive 108, though the backup drive Z: 122 will not know the random drive names and will have to be reset.

As discussed above, system files are stored on the system drive 108, and trusted documents and system temporary files are stored on the document drive 110. Downloads, including emails, should be stored in the quarantine permanent drive 124. The contents of emails, PDFs, spreadsheets, word processor documents, music, pictures, and so on from downloaded files may only be transferred to the document drive 110 via a special copy and paste operation. The system may open a file in the document drive 110 and paste the content from the downloaded email, PDF, etc., into the file in the document drive 110. When completed, the file is erased and wiped up from the quarantine permanent drive 124, except for downloaded executable files from non-trusted manufacturers or compressed files (unless the user desires to erase the entire quarantine permanent drive 124 on a regular basis). In some embodiments, the system prevents copying of entire files through normal means directly from the quarantine permanent drive 124 to the document drive 110. Also, the system does not allow running of any executable files stored on the document drive 110 if copying through a special copy and paste program. Instead, executable files may be stored on the document drive 110, but only as a backup.

Executable files created by non-trusted manufacturers can only be stored on the quarantine permanent drive 124, and should be backed up. The system only runs them from the quarantine permanent drive 124, where they are not monitored by the security alarm. The output data may only be stored in the quarantine permanent drive 124, and may only be transferred to the document drive 110 through the special copy and paste procedure. In the event malware is detected in the quarantine permanent drive 124, the quarantine permanent drive 124 is erased and the user starts over (the non-trusted executable files can be copied back to the quarantine permanent drive 124 from backups stored on the document drive 110). In this way, the malware has nowhere to go since the location of the document drive 110 is hidden. If the malware attempts to find the document drive 110 through the system, the alarm circuit will detect the abnormal drive usage pattern and signal the alarm.

Figure 3:
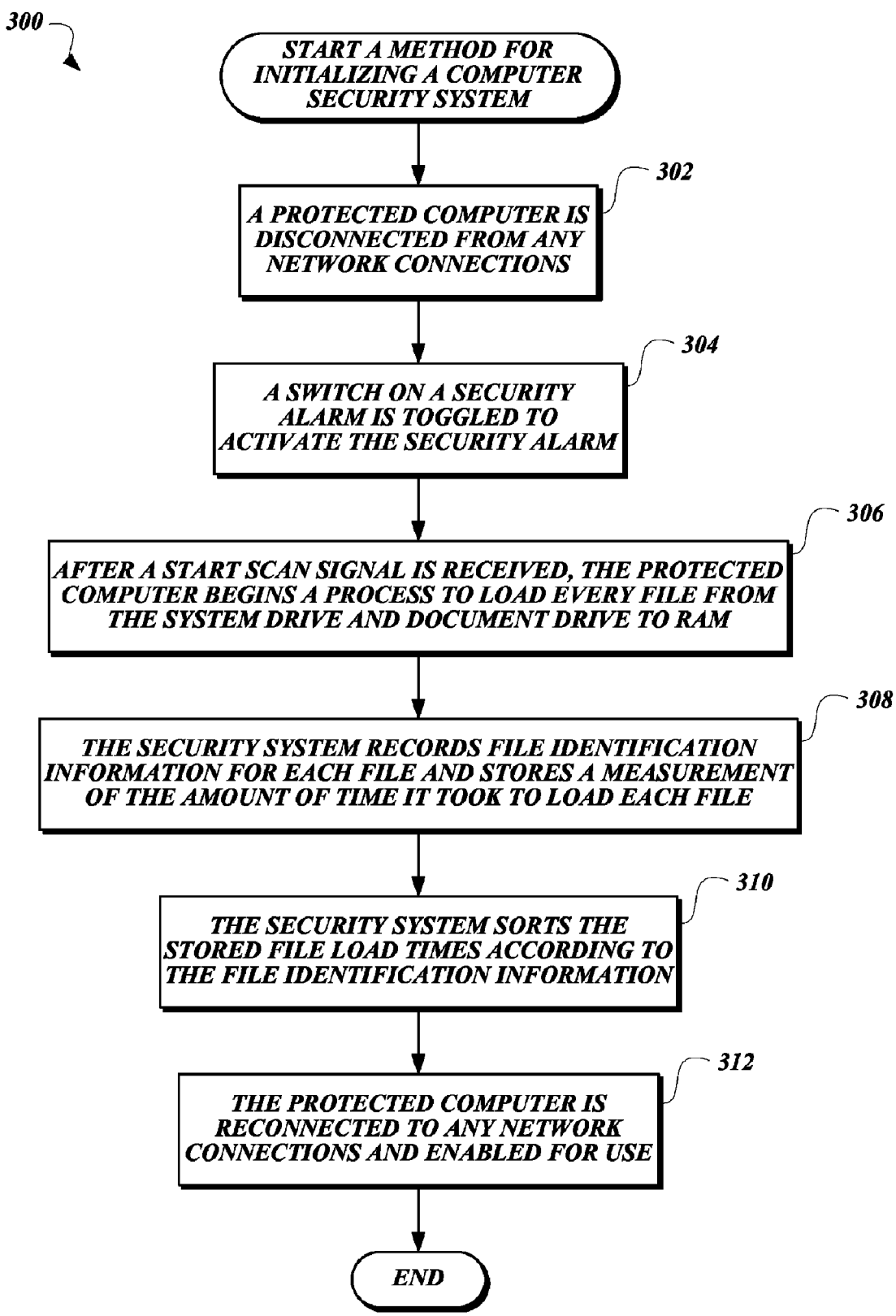
FIG. 3 illustrates a method for initializing a computer security system according to various embodiments of the present disclosure.

FIG. 3 illustrates an exemplary embodiment of a method 300 for initializing a computer security system. From a start block, the method 300 proceeds to block 302, where a protected computer is disconnected from any network connections. Next, at block 304, a switch on a security alarm is toggled to activate the security alarm. The method then proceeds to block 306, where, after a start scan signal is received, the protected computer begins a process to load every file from the system drive 108 and document drive 110 to RAM. The start signal may be generated by a program executed by the protected computer, or may be generated by the press of a button located on the external alarm circuit 254.

Next, at block 308, the security system records file identification information for each file and stores a measurement of the amount of time it took to load each file. This information is recorded in a location accessible to the external alarm circuit 254. Each file is loaded one at a time to prevent multiple concurrent drive accesses from confusing the results. In some embodiments, the measurement of the amount of time it took to load each file is made by the external alarm circuit 254 and the drive activity monitor 252. In some embodiments, information is not stored for each file, but instead the maximum time needed to load a file is determined, and this single value is stored by the external alarm circuit 254. In some embodiments, the external alarm circuit 254 also records the storage size of the total system files.

Once all of the files have been processed, the method 300 proceeds to block 310, where the security system sorts the stored file load times according to the file identification information. Next, at block 312, the protected computer is reconnected to any network connections and enabled for use. The method 300 then proceeds to an end block and terminates.

Figure 4:
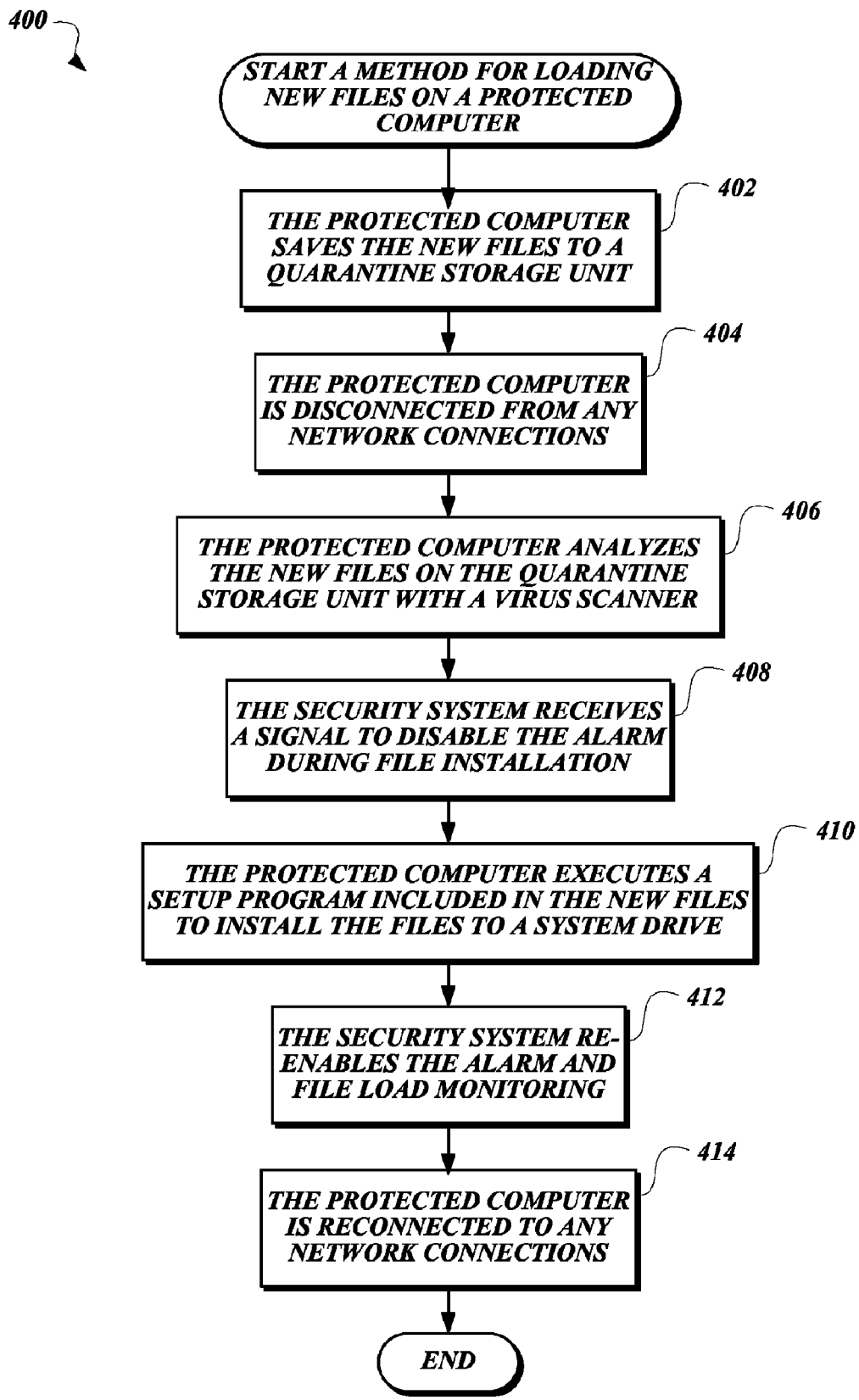
FIG. 4 illustrates a method for loading new files on a protected computer according to various embodiments of the present disclosure.

FIG. 4 illustrates an exemplary method 400 for loading new files on a protected computer. These files would be, for example, program files to be loaded on the document drive 110 or system files to be loaded on the system drive 108. Manufacturer programs that are stored on the system drive 108 carry the manufacturer's warranty that the program does not contain an embedded virus. While not required, it is preferable to have assurances that this is the case. For example, manufacturers may have licensed software engineers who sign the software source code files and accept personal responsibility for their contents. As another example, a testing rating by the manufacturer or by a testing agency may be shown. Downloaded programs may show the seal of the software engineer and the testing rating stamp. In the event of a forged signature and the unwanted installation of malware, finding the secret storage locations is still difficult, as the root directory location on the system drive 108 may be different for every user.

From a start block, the method 400 proceeds to block 402, where the protected computer saves the new files to a quarantine storage unit 106. Next, at block 404, the protected computer is disconnected from any network connections. The method then proceeds to block 406, where the protected computer analyzes the new files on the quarantine storage unit 106 with a virus scanner. Next, at block 408, the security system receives a signal to disable the alarm during file installation. In some embodiments, this may be done through a password entered by a user, or by inserting a key CD. In other embodiments, this may be done by the user actuating a switch on the external alarm circuit 254.

The method 400 then proceeds to block 410, where the protected computer executes a setup program included in the new files to install the files to the system drive 108. Next, at block 412, the security system re-enables the alarm and file load monitoring. In some embodiments, the security system loads the newly installed files to save the file load time information before re-enabling the alarm and the file load monitoring. The method 400 then continues to block 414, where the protected computer is reconnected to any network connections. Finally, the method 400 proceeds to an end block and terminates.

Figure 5:
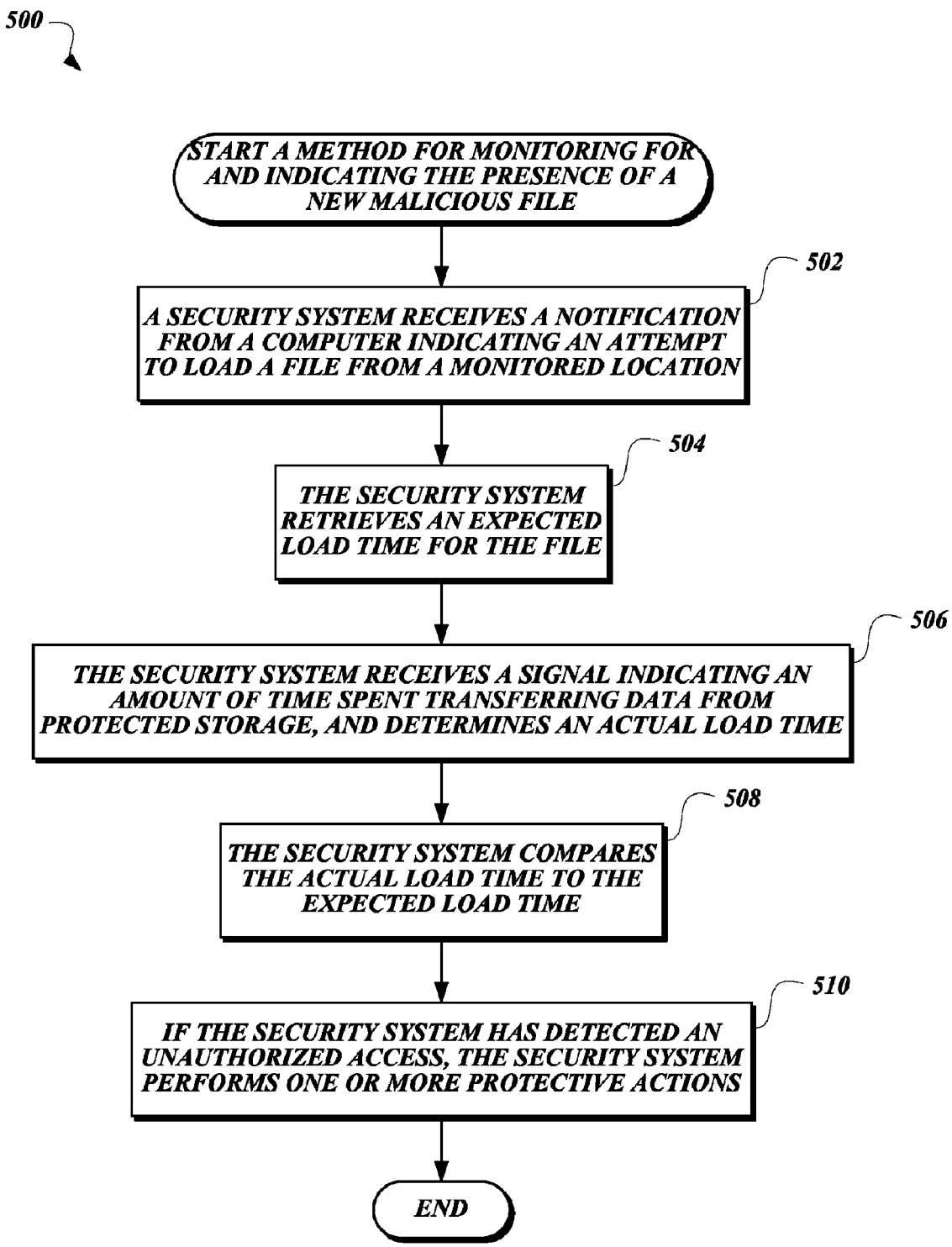
FIG. 5 illustrates a method for monitoring for and indicating the presence of a new malicious file according to various embodiments of the present disclosure.

FIG. 5 illustrates an exemplary method 500 for monitoring for and indicating the presence of a new malicious file. From a start block, the method 500 proceeds to block 502, where the security system receives a notification from a computer indicating an attempt to load a file from a monitored location. As discussed above, the monitored location may be any location within the system storage unit 102.

Next, in block 504, the security system retrieves an expected load time for the file. The security system retrieves the expected load time based on the file identification information associated with the file being loaded. The security system may determine what file is being loaded in a number of ways. In one embodiment, the notification from the computer contains the file identification information of the file being loaded. In another embodiment, the security system stores a copy of a file allocation table associated with the monitored location, and the security system may determine the file identification information based on the file allocation table and an indicated portion of the disk accessed according to the notification from the computer. If the security system cannot find the expected load time for the given file identification information, or the file identification information is otherwise missing for the file, the security system may immediately indicate the presence of malware. Since the security system performs this lookup, the external alarm circuit 254 may contain its own processor to perform the lookup. Also, since the stored file identification information is sorted, the external alarm circuit 254 processor need not be very fast, though it is preferable to have a sure circuit with a reasonable frequency and time transient.

Assuming the security system was able to find the stored information for the file, the method 500 proceeds to block 506, where the security system receives a signal indicating an amount of time spent transferring data from protected storage, and determines an actual load time. As discussed above, the signal may be received from the drive activity monitor 252, and the signal may indicate either an elapsed time for file access or may merely indicate a start time for access and a stop time for access. Next, at block 508, the security system compares the actual load time to the expected load time.

The method 500 then proceeds to block 510, where, if the security system has detected an unauthorized access, the security system performs one or more protective actions. In one embodiment, the one or more protective actions includes disconnecting the system storage unit 102, preferably through a relay that completely decouples the system storage unit 102 from the rest of the protected computer. In some embodiments, the external alarm circuit 254 also displays a notification to the user that malware has been detected, and/or plays an audible alarm. In yet other embodiments, the size of the system storage is also checked against the initial stored value to determine whether the virus has mutated, in which case an administrator will have to manually clean the system or rebuild from backups. Finally, the method 500 proceeds to an end block and terminates.

While illustrative embodiments have been illustrated and described, it will be appreciated that various changes can be made therein without departing from the scope of the invention.

The embodiments of the invention in which an exclusive property or privilege is claimed are defined as follows:

1. A system for providing a secure computing environment within a computer, comprising:
    a system storage device for use by a computer and configured to store system files;
    a drive activity monitor coupled to an activity indicator configured to indicate when the system storage device is accessed; and
    an alarm circuit coupled to the drive activity monitor and the system storage device, wherein the alarm circuit is configured to store an expected load time for one or more files stored on the system storage device, and is configured to disconnect the system storage device from the computer based on information collected by the drive activity monitor.

2. The system of claim 1, wherein the drive activity monitor comprises a light sensor, and wherein the activity indicator comprises a drive activity light.

3. The system of claim 1, wherein the drive activity monitor comprises a visual detector that detects an icon displayed when the storage device is activated.

4. The system of claim 1, wherein the alarm circuit is configured to store an expected load time for each file stored on the system storage device.

5. The system of claim 4, wherein the drive activity monitor is configured to sense an amount of time taken to load a file from the system storage device and to communicate the amount of time taken to the alarm circuit.

6. The system of claim 1, wherein the system storage device is coupled to the computer via a relay, and wherein the external alarm circuit is configured to disconnect the relay based on information collected by the drive activity monitor.

7. The system of claim 1, wherein the system storage device includes a system drive and a plurality of decoy drives.

8. The system of claim 7, wherein a drive name of the system drive is a randomly generated numerical value.

9. The system of claim 1, further comprising a document storage device and a quarantine storage device, wherein the quarantine storage device is configured to store untrusted files, and wherein the computer is configured to only allow the contents of an untrusted file on the quarantine storage device to be stored on the document storage device via a copy-and-paste operation.

10. A method for protecting a computer system from malware, comprising:
    receiving a notification identifying a file to be loaded from a protected storage location;
    retrieving an expected load time for the file;
    detecting an activation of a disk drive with a disk activity detection circuit that detects an attempt to access the protected storage location;
    comparing an actual load time for the file to the expected load time; and
    performing a protective action when the actual load time does not match the expected load time.

11. The method of claim 10, wherein the disk activity detection circuit detects an attempt to access the protected storage location by monitoring a drive activity light.

12. The method of claim 10, further comprising determining the actual load time for the file by monitoring a drive activity light while the file is being loaded.

13. The method of claim 10, wherein the protective action includes disconnecting the protected storage location from the computer system.

14. The method of claim 13, further comprising reconnecting the protected storage location to the computer system only upon interaction with a physical switch of the computer system.

15. The method of claim 10, wherein the protective action includes presenting an audible or visual alarm.

16. The method of claim 10, further comprising:
    loading each file from the protected storage location to determine the expected load time for each file;
    generating file identification information for each file; and
    storing the expected load time and file identification information for each file in an alarm circuit.

17. The method of claim 16, wherein loading each file from the protected storage location to determine the expected load time for each file includes measuring the expected load time for each file by monitoring a drive activity light.

18. A system for providing secure storage of computer files, comprising:

storage means for storing a set of monitored files;
an activity indicator light for indicating an attempt to access the storage means; and
means for monitoring the activity indicator light, configured to store expected load times for the set of monitored files and to indicate the presence of malware upon detection of an indication by the activity indicator light that does not match an indication of an allowable attempt to access the storage means.

19. The system of claim 18, further comprising means for disconnecting the storage means from the system upon an indication of the presence of malware.

20. The system of claim 18, further comprising means for presenting an audible or visual alarm upon an indication of the presence of malware.

* * * * *